US011024167B2

(12) United States Patent
Kanehara et al.

(10) Patent No.: US 11,024,167 B2
(45) Date of Patent: Jun. 1, 2021

(54) INFORMATION COLLECTION SYSTEM AND INFORMATION COLLECTION APPARATUS (71) Applicant: Toyota Jidosha Kabushiki Kaisha, Toyota (JP)

(72) Inventors: Isao Kanehara, Miyoshi (JP); Kazuhiro Umeda, Nisshin (JP); Hideo Hasegawa, Nagoya (JP); Tsuyoshi Okada, Toyota (JP); Shinjiro Nagasaki, Tokyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 16/227,236

(22) Filed: Dec. 20, 2018

(65) Prior Publication Data
US 2019/0197889 A1 Jun. 27, 2019

(30) Foreign Application Priority Data

Dec. 26, 2017 (JP) .............................. JP2017-249340

(51) Int. Cl.
G08G 1/054 (2006.01)
G05D 1/02 (2020.01)
(Continued)

(52) U.S. Cl.
CPC ........... G08G 1/054 (2013.01); G05D 1/0297 (2013.01); G08G 1/0112 (2013.01);
(Continued)

(58) Field of Classification Search
CPC .. G08G 1/0112; G08G 1/0133; G08G 1/0175; G08G 1/052; G08G 1/054;
(Continued)

(56) References Cited

U.S. PATENT DOCUMENTS 6,240,346 B1 * 5/2001 Pignato ......................... 340/463
8,676,431 B1 * 3/2014 Mariet ................. G05D 1/0238
701/28

(Continued)

FOREIGN PATENT DOCUMENTS

CN 103680144 A 3/2014
CN 105243851 A 1/2016
(Continued)

Primary Examiner — Faris S Almatrahi
Assistant Examiner — David A Testardi
(74) Attorney, Agent, or Firm — Dinsmore & Shohl LLP (57) ABSTRACT An information collection system enables crackdown on traffic violations by vehicles to be carried out in a preferable manner. The information collection system includes an autonomous mobile object that moves autonomously based on an operation command and a server apparatus. The autonomous mobile object includes a driving information acquirer that acquires driving information relating to the state of driving of a nearby vehicle, image acquirer that captures an image of the environment of the autonomous mobile object, a detector that detects a traffic violation by a nearby vehicle based on the driving information, and a controller that sends violation information relating to a traffic violation to the server apparatus. When a traffic violation is detected by the detector, the controller sends a captured image relating to the violator's vehicle and the driving information about the violator's vehicle, to the server apparatus as the violation information.

8 Claims, 8 Drawing Sheets (51) Int. Cl.
*G08G 1/01* (2006.01)
*G08G 1/017* (2006.01)
*G05D 1/00* (2006.01)

(52) U.S. Cl.
CPC .......... *G08G 1/0125* (2013.01); *G08G 1/0133* (2013.01); *G08G 1/0175* (2013.01); *G05D 1/0088* (2013.01); *G05D 1/0231* (2013.01); *G05D 2201/0209* (2013.01); *G05D 2201/0213* (2013.01)

(58) Field of Classification Search
CPC .. G08G 1/0125; G05D 1/0055; G05D 1/0088; G05D 1/0205; G05D 1/0246; G05D 1/0248; G05D 2201/0213; G06K 2209/15
See application file for complete search history.

(56) References Cited

U.S. PATENT DOCUMENTS

| | | | | |
|---|---|---|---|---|
| 8,818,681 | B1* | 8/2014 | Dolgov | G05D 1/021 701/96 |
| 10,222,798 | B1* | 3/2019 | Brady | G05D 1/0278 |
| 10,571,292 | B2* | 2/2020 | Schmell | G08G 1/0125 |
| 10,719,899 | B1* | 7/2020 | Dabell | G06F 16/90335 |
| 2006/0171564 | A1* | 8/2006 | Simon | G08G 1/0175 382/105 |
| 2007/0103339 | A1* | 5/2007 | Maxwell | G08G 1/0175 340/942 |
| 2010/0302371 | A1* | 12/2010 | Abrams | G08G 1/0175 348/149 |
| 2015/0066284 | A1* | 3/2015 | Yopp | B60W 50/10 701/29.2 |
| 2015/0281651 | A1* | 10/2015 | Kaushik | H04N 21/2743 348/148 |
| 2015/0344038 | A1* | 12/2015 | Stenneth | G07C 5/0816 340/439 |
| 2016/0171894 | A1* | 6/2016 | Harvey | G05D 1/0293 701/23 |
| 2016/0187139 | A1* | 6/2016 | Agulnik | G06Q 50/26 701/409 |
| 2017/0036673 | A1* | 2/2017 | Lee | B60W 30/09 |
| 2017/0278402 | A1* | 9/2017 | Yalla | G01C 21/3602 |
| 2018/0018869 | A1* | 1/2018 | Ahmad | G05D 1/0223 |
| 2018/0061237 | A1* | 3/2018 | Erickson | G08G 1/163 |
| 2018/0061253 | A1* | 3/2018 | Hyun | G08G 1/015 |
| 2018/0137754 | A1* | 5/2018 | Alon | G06T 7/251 |
| 2018/0164106 | A1* | 6/2018 | Peterson | G01C 21/3438 |
| 2018/0281657 | A1* | 10/2018 | Healey | G05D 1/0234 |
| 2018/0336427 | A1* | 11/2018 | Gibbs | G06K 9/00825 |
| 2019/0009785 | A1* | 1/2019 | Lawrenson | G01S 13/931 |
| 2019/0043355 | A1* | 2/2019 | Ferguson | G05D 1/0291 |
| 2019/0051142 | A1* | 2/2019 | Wiles | G08B 25/08 |
| 2019/0113915 | A1* | 4/2019 | Laur | G08B 13/00 |
| 2019/0225145 | A1* | 7/2019 | Sippl | B60Q 5/005 |
| 2020/0008028 | A1* | 1/2020 | Yang | G08G 1/012 |
| 2020/0079382 | A1* | 3/2020 | Boulton | B60W 40/04 |

FOREIGN PATENT DOCUMENTS

| | | |
|---|---|---|
| CN | 107004352 A | 8/2017 |
| CN | 107481530 A | 12/2017 |
| JP | 2004-326492 A | 11/2004 |
| JP | 2015-092320 A | 5/2015 |
| JP | 2016-181239 A | 10/2016 |
| WO | WO-2014/080388 A2 * | 5/2014 |

* cited by examiner

INFORMATION COLLECTION SYSTEM AND INFORMATION COLLECTION APPARATUS

CROSS REFERENCE TO RELATED APPLICATION

This application claims priority to Japanese Patent Application No. 2017-249340 filed on Dec. 26, 2017 which is hereby incorporated by reference herein in its entirety.

BACKGROUND

Technical Field

The present disclosure relates to a system and apparatus that collects information using mobile objects.

Description of the Related Art

There have been developed systems that perform surveillance over an area using mobile objects. For example, Patent literature 1 in the citation list presented below discloses a system that collects images using terminals provided in mobile objects to create a virtual surveillance network.

Various studies have been performed on development of services using mobile objects that are capable of moving autonomously. For example, Patent literature 2 in the citation list discloses a traffic system for transportation of passengers and/or goods that dispatches autonomous vehicles on users' demand.

Vehicles described in Patent Literature 2 can be used as the mobile objects described in Patent Literature 1 to construct a system that is capable of collecting increased amount of information.

Patent Literature 3 in the citation list discloses a technology pertaining to the detection of vehicle speeding violations. In this technology, each vehicle sends information about its position and speed to a server, and the server compares that information with information about the legal speed to detect a speeding violation by the vehicle.

CITATION LIST

Patent Literature

Patent Literature 1: Japanese Patent Application Laid-Open No. 2016-181239
Patent Literature 2: Japanese Patent Application Laid-Open No. 2015-092320
Patent Literature 3: Japanese Patent Application Laid-Open No. 2004-326492

SUMMARY

There are known systems that automatically detects vehicle speeding violations. For example, there is a known system including a vehicle speed monitor for monitoring the vehicle speed that is provided on the roadside of a road on which vehicle speed violations are to be cracked down. While this system can automatically detect vehicle speeding violations by the vehicle speed monitor provided on the roadside, it cannot detect vehicle speed violations in sections of the road for which the vehicle speed monitor is not provided. The technology described in Patent Literature 3 enables detection of vehicle speeding violations without the provision of a vehicle speed monitor on the roadside. However, in cases where a vehicle is not equipped with means for sending information about its position and speed to the server, the server cannot detect speeding violation by that vehicle.

Even if images have been collected in an area by utilizing the technology described in Patent Literature 1, it is difficult to detect traffic violations by such images.

As above, technologies for detecting vehicle traffic violations are susceptible to improvement.

The present disclosure has been made in view of the above problems. An object of the present disclosure is to provide a technology that enables crackdown on vehicle traffic violations to be carried out in a preferable manner.

In the disclosure, the "crackdown" includes at least one of detecting traffic violations, and/or notifying the fact of the violation to the police force, to impose penalties to the violator.

An information collection system according to the present disclosure is a system comprising an autonomous mobile object and a server apparatus. Specifically, the autonomous mobile object comprises a driving information acquirer configured to acquire driving information relating to the state of driving of a nearby vehicle, which is defined as a vehicle present in the vicinity of the autonomous mobile object, an image acquirer configured to capture an image of the environment of the autonomous mobile object, a detector configured to detect a traffic violation by the nearby vehicle on the basis of the driving information acquired by the driving information acquirer, and a controller configured to send violation information relating to the traffic violation detected by the detector to the server apparatus. The server apparatus comprises a commander configured to send the operation command to the autonomous mobile object and a first storage unit configured to receive the violation information from the autonomous mobile object and store it. When the traffic violation is detected by the detector, the controller sends a captured image relating to the violator's vehicle acquired by the image acquirer and the driving information about the violator's vehicle acquired by the driving information acquirer to the server apparatus as the violation information.

The autonomous mobile object is a mobile object that moves autonomously on the basis of a certain operation command. The autonomous mobile object may be an autonomous vehicle. The operation command is information including, for example, information about a destination and/or a travel route and information about a service to be provided by the autonomous mobile object on the route. For example, in the case where the autonomous mobile object is intended for transportation of passengers and/or goods, the operation command may be a command that causes the autonomous mobile object to transport passengers and/or goods along a predetermined route. In the case where the autonomous mobile object is intended for transportation of a shop, facility, or equipment, the operation command may be a command that causes the autonomous mobile object to travel to a certain destination, and prepare the shop, facility, or equipment for service at that place.

The autonomous mobile object has the driving information acquirer for acquiring certain information about the state of driving of vehicles present in the vicinity of the autonomous mobile object (or nearby vehicles). This information will be hereinafter referred to as "driving information". The autonomous mobile object can acquire the driving information about nearby vehicles by using the driving information acquirer while autonomously moving on the basis of an operation command. The autonomous mobile object also has the detector for detecting a traffic violation by a nearby vehicle. In other words, the autonomous mobile object can detect traffic violations by nearby vehicles while autonomously moving on the basis of an operation command. In the case where the autonomous mobile object travels along a predetermined route based on an operation command, the autonomous mobile object can detect traffic violations by nearby vehicles in that route.

The autonomous mobile object also has the controller configured to send certain information relating to a detected traffic violation to the server apparatus. This information will be hereinafter referred to as "violation information". The server apparatus is an apparatus that performs management of the autonomous mobile object by sending operation commands to it and receives and stores violation information sent from the autonomous mobile object.

In order to actually crack down on the violator on the basis of the detected traffic violation, it is necessary to identify the violator's vehicle. For this purpose, the autonomous mobile object sends a captured image relating to the violator's vehicle acquired by its image acquirer to the server apparatus with the driving information about the violator's vehicle as the violation information. Thus, the server apparatus can get detailed information of the traffic violation detected by the autonomous mobile object and identify the violator's vehicle.

The above-described information collection system may include a plurality of autonomous mobile objects. Moreover, the travel routes of the autonomous mobile objects can be set in desired manners by operation commands. Therefore, the information collection system according to the present disclosure can construct a network of crackdown on traffic violations using autonomous mobile objects in any desired manner. This enables appropriate crackdown on vehicle traffic violations.

The aforementioned traffic violation may include speeding in excess of the legal speed limit. In that case, the driving information acquirer may acquire the speed of the nearby vehicle as the driving information, and the detector may detect speeding of the nearby vehicle in excess of the legal speed limit as the traffic violation.

The aforementioned traffic violation may include failure in maintaining a sufficient inter-vehicle distance. In that case, the driving information acquirer may sense a plurality of vehicles that pass by the side of the autonomous mobile object to thereby acquire the inter-vehicle distance between the plurality of vehicles as the driving information, and the detector may detect failure by the nearby vehicle in maintaining a sufficient inter-vehicle distance as the traffic violation.

The types of traffic violations are not limited to those mentioned above. The information collection system according to the present disclosure enables appropriate crackdown on known traffic violations.

In the information collection system according to the present disclosure, the captured image relating to the violator's vehicle acquired by the image acquirer may comprise an image of a license plate of that vehicle. This enables reliable identification of the violator's vehicle. The captured image relating to the violator's vehicle acquired by the image acquirer may comprise an image of the driver of that vehicle. This facilitates the identification of the violator as the driver of that vehicle.

In the information collection system according to the present disclosure, the autonomous mobile object may further comprise a notifier configured to provide a notice that provides enlightenment about a certain traffic issue. Then, the information collection system can provide enlightenment aiming at prevention of traffic violation to the drivers of vehicles present around the autonomous mobile object by the autonomous mobile object. This can lead to a reduction of traffic violations.

According to another aspect of the present disclosure, there is provided an information collection apparatus. Specifically, the information collection apparatus according to the present disclosure comprises an autonomous mobile object that moves autonomously on the basis of an operation command, a driving information acquirer provided in the autonomous mobile object configured to acquire driving information relating to the state of driving of a nearby vehicle, which is defined as a vehicle present in the vicinity of the autonomous mobile object, an image acquirer provided in the autonomous mobile object configured to capture an image of the environment of the autonomous mobile object, a detector configured to detect a traffic violation by the nearby vehicle on the basis of the driving information acquired by the driving information acquirer, a second storage unit provided in the autonomous mobile object configured to store violation information relating to the traffic violation detected by the detector, and a controller provided in the autonomous mobile object. When the traffic violation is detected by the detector, the controller stores a captured image relating to the violator's vehicle acquired by the image acquirer and the driving information about the violator's vehicle acquired by the driving information acquirer in the second storage unit as the violation information.

According to another aspect of the present disclosure, there is provided an information collection system or an information collection apparatus including at least one of the above-described means. According to still another aspect of the present disclosure, there is provided a method carried out by the above-described information collection system or information collection apparatus. The processing and means described above may be employed in any combinations, as far as it is technically feasible to do so.

The present disclosure enables crackdown on traffic violations to be carried out in a preferable manner.

DETAILED DESCRIPTION

First Embodiment

<Outline of the System>

The general configuration of an information collection system according to a first embodiment will be described with reference to FIG. 1. The information collection system according to the first embodiment includes a plurality of autonomous vehicles 100A, 100B, . . . , 100n that can run autonomously on the basis of commands given thereto and a server apparatus 200 that sends the commands. The autonomous vehicle 100 is a self-driving vehicle that provides a predetermined service. The server apparatus 200 is an apparatus that performs management of the plurality of autonomous vehicles 100. In the following, the plurality of autonomous vehicles will be collectively referred to as autonomous vehicles 100, when it is not necessary to distinguish individual vehicles.

The autonomous vehicles 100 are multipurpose mobile objects that may individually have different functions and can travel on the road autonomously without a human driver. Examples of the autonomous vehicles 100 include vehicles that travel along a predetermined route to pick up and drop off persons, on-demand taxis that operate on users' demand, and mobile shops that enable shop operation at a desired destination. In the case where the autonomous vehicles 100 are intended for transportation of passengers and/or goods, they may transport passengers and/or goods along a predetermined route. In the case where the autonomous vehicles 100 are intended for transportation of a shop, facility, or equipment, they may travel to a destination, and the shop, facility, or equipment may be prepared for operation at that place. The autonomous vehicles 100 may be vehicles that patrol on the road for the purpose of monitoring facilities and/or infrastructures or preventing crimes. In that case, the autonomous vehicles 100 may be configured to travel along a predetermined patrol route. The autonomous vehicles 100 are also called as electric vehicle palettes (EV palettes).

The autonomous vehicles 100 are not required to be vehicles without humans. For example, a sales staff(s), a customer service attendant(s), or an operation monitoring crew(s) may be on board. The autonomous vehicles 100 are not required to be vehicles that can run completely autonomously. For example, they may be vehicles that can be driven by a human driver or accept a human assistance in some circumstances.

Moreover, the autonomous vehicles 100 have the functions of accepting requests by users, responding to the users, performing appropriate processing in response to the users' requests, and reporting the result of processing to the users. The autonomous vehicles 100 may be configured to transfer the requests by users that they cannot fulfil by themselves to the server apparatus 200 so as to fulfil them in cooperation with the server apparatus 200.

The server apparatus 200 is an apparatus that directs the operation of the autonomous vehicles 100. For example, in the case where the autonomous vehicles 100 are on-demand taxis, the server apparatus 200 receives a request by a user to get a location to which an autonomous vehicle 100 is to be dispatched and the user's destination. Then, the server apparatus 200 sends to an autonomous vehicle 100 that is running in the neighborhood of the requested location a command to the effect that the autonomous vehicle 100 is to transport a person(s) from the place of departure to the destination. This command can cause the autonomous vehicle 100 to travel along a specific route. The operation commands are not limited to commands that cause an autonomous vehicle to travel from a place of departure to a destination. Examples of other operation commands may include a command that causes an autonomous vehicle 100 to travel to a determined destination to open a shop at that place and a command that causes an autonomous vehicle 100 to survey streets while traveling along a determined route. As above, operation commands may specify operations to be done by autonomous vehicles 100 besides traveling.

Besides the above-described functions, the server apparatus 200 in the information collection system according to this embodiment has the function of causing an autonomous vehicle 100 to collect certain information relating to traffic violations (which will be hereinafter referred to as "violation information") by vehicles present around that autonomous vehicle 100 (which will be hereinafter referred to as "nearby vehicles"), when a request for crackdown on traffic violations is made by the police. Specifically, in response to the request for crackdown, the autonomous vehicle 100 collects information about the state of driving of nearby vehicles (which will be hereinafter referred to as "driving information") while traveling along a certain route based on an operation command. If the autonomous vehicle 100 detects a traffic violation by a nearby vehicle on the basis of the acquired driving information, it sends the violation information about that vehicle to the server apparatus 200. Thus, the information collection system enables the police to check traffic violations by vehicles present around the autonomous vehicle 100 travelling along a certain route.

<System Configuration>

In the following, the elements of the system will be described in detail.

Figure 1:
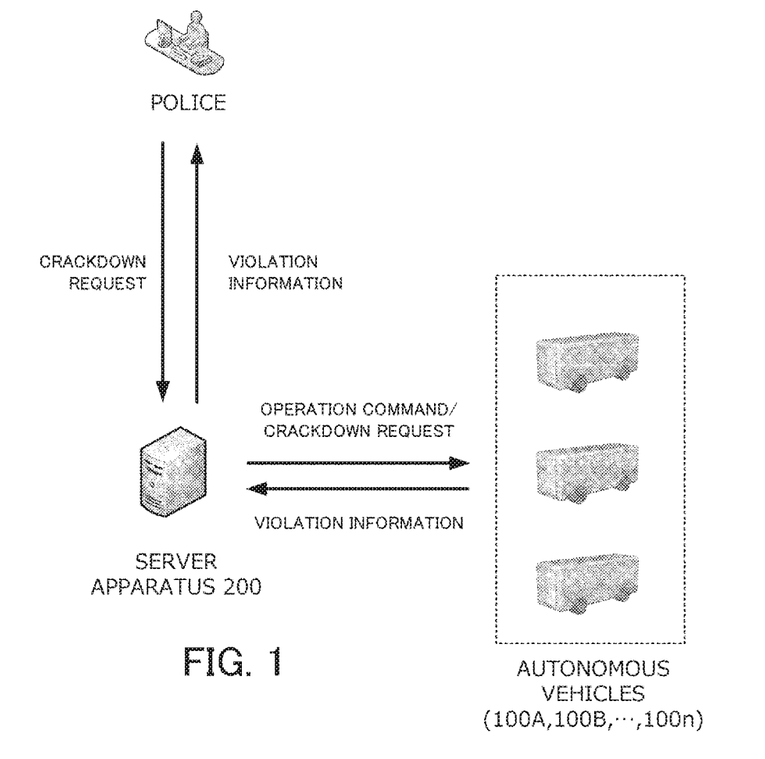
FIG. 1 indicates the basic system configuration of an information collection system according to a first embodiment.
Figure 2:
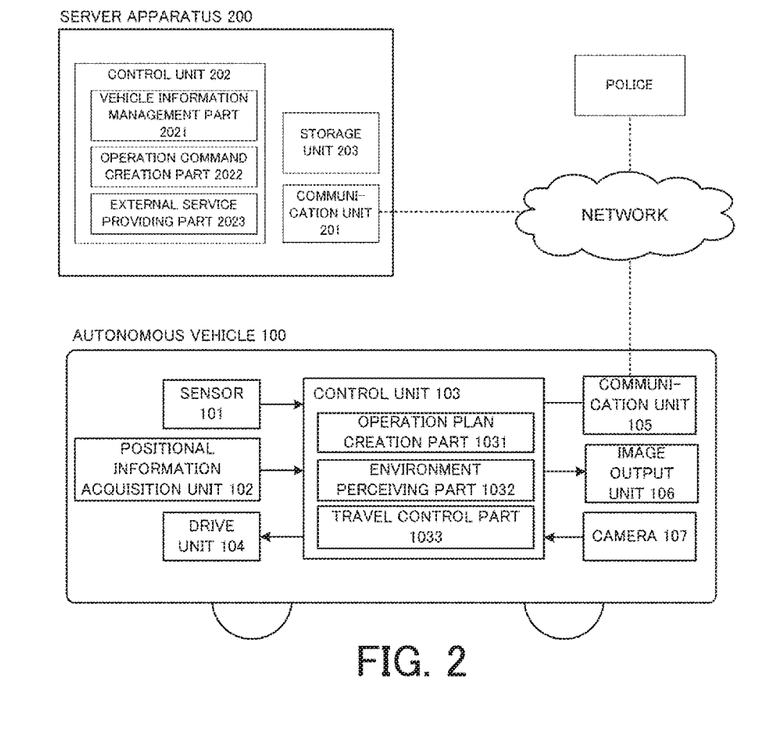
FIG. 2 is a block diagram indicating exemplary elements of the information collection system.

FIG. 2 is a block diagram indicating an example of the configuration of the autonomous vehicle 100 and the server apparatus 200 shown in FIG. 1. The system may include a plurality of autonomous vehicles 100.

The autonomous vehicle 100 is a vehicle that runs according to a command received from the server apparatus 200. Specifically, the autonomous vehicle 100 creates a traveling route on the basis of the operation command received by wireless communication and travels on the road in an appropriate manner while sensing the environment of the vehicle.

The autonomous vehicle 100 has a sensor 101, a positional information acquisition unit 102, a control unit 103, a driving unit 104, a communication unit 105, and an image output unit 106. The autonomous vehicle 100 operates by electrical power supplied by a battery.

The sensor 101 is means for sensing the environment of the vehicle, which typically includes a stereo camera, a laser scanner, LIDAR, radar, or the like. Information acquired by the sensor 101 is sent to the control unit 103.

The positional information acquisition unit 102 is means for acquiring the current position of the vehicle, which typically includes a GPS receiver. Information acquired by the positional information acquisition unit 102 is sent to the control unit 103.

The control unit 103 is a computer that controls the autonomous vehicle 100 on the basis of the information acquired through the sensor 101. The control unit 103 is, for example, a microcomputer.

The control unit 103 includes as functional modules an operation plan creation part 1031, an environment perceiving part 1032, and a travel control part 1033. These functional modules may be implemented by executing programs stored in storage means, such as a read only memory (ROM), by a central processing unit (CPU).

The operation plan creation part 1031 receives an operation command from the server apparatus 200 and creates an operation plan of the vehicle. In this embodiment, the operation plan is data that specifies a route along which the autonomous vehicle 100 is to travel and a task(s) to be done by the autonomous vehicle 100 in a part or the entirety of that route. Examples of data included in the operation plan are as follows.

(1) Data Specifying a Route Along which the Vehicle is to Travel by a Set of Road Links The route along which the vehicle is to travel may be created automatically from a given place of departure and a given destination with reference to map data stored in the storage means. Alternatively, the route may be created using an external service.

(2) Data Specifying a Task(s) to be Done by the Vehicle at a Certain Location(s) in the Route Examples of the tasks to be done by the vehicle include, but are not limited to, picking up or dropping off a person(s), loading or unloading goods, opening or closing a mobile shop, collecting data, and outputting an image (on an outside display that will be described later).

The operation plan created by the operation plan creation part 1031 is sent to the travel control part 1033, which will be described later.

The environment perceiving part 1032 perceives the environment around the vehicle using the data acquired by the sensor 101. What is perceived includes, but is not limited to, the number and the position of lanes, the number and the position of other vehicles present around the vehicle, the number and the position of obstacles (e.g. pedestrians, bicycles, structures, and buildings) present around the vehicle, the structure of the road, and road signs. What is perceived may include anything that is useful for autonomous traveling.

The environment perceiving part 1032 may track a perceived object(s). For example, the environment perceiving part 1032 may calculate the relative speed of the object from the difference between the coordinates of the object determined in a previous step and the current coordinates of the object.

The data relating to the environment acquired by the environment perceiving part 1032 is sent to the travel control part 1033, which will be described below. This data will be hereinafter referred to as "environment data".

The travel control part 1033 controls the traveling of the vehicle on the basis of the operation plan created by the operation plan creation part 1031, the environment data acquired by the environment perceiving part 1032, and the positional information of the vehicle acquired by the positional information acquisition unit 102. For example, the travel control part 1033 causes the vehicle to travel along a predetermined route in such a way that obstacles will not enter a specific safety zone around the vehicle. A known autonomous driving method may be employed to drive the vehicle.

The driving unit 104 is means for driving the autonomous vehicle 100 according to a command issued by the travel control part 1033. The driving unit 104 includes, for example, a motor and inverter for driving wheels, a brake, a steering system, and a secondary battery.

The communication unit 105 serves as communication means for connecting the autonomous vehicle 100 to a network. In this embodiment, the communication unit can communicate with another device (e.g. the server apparatus 200) via a network using a mobile communication service based on e.g. 3G or LTE.

The communication unit 105 may further include communication means for inter-vehicle communication with other autonomous vehicles 100.

Figure 3:
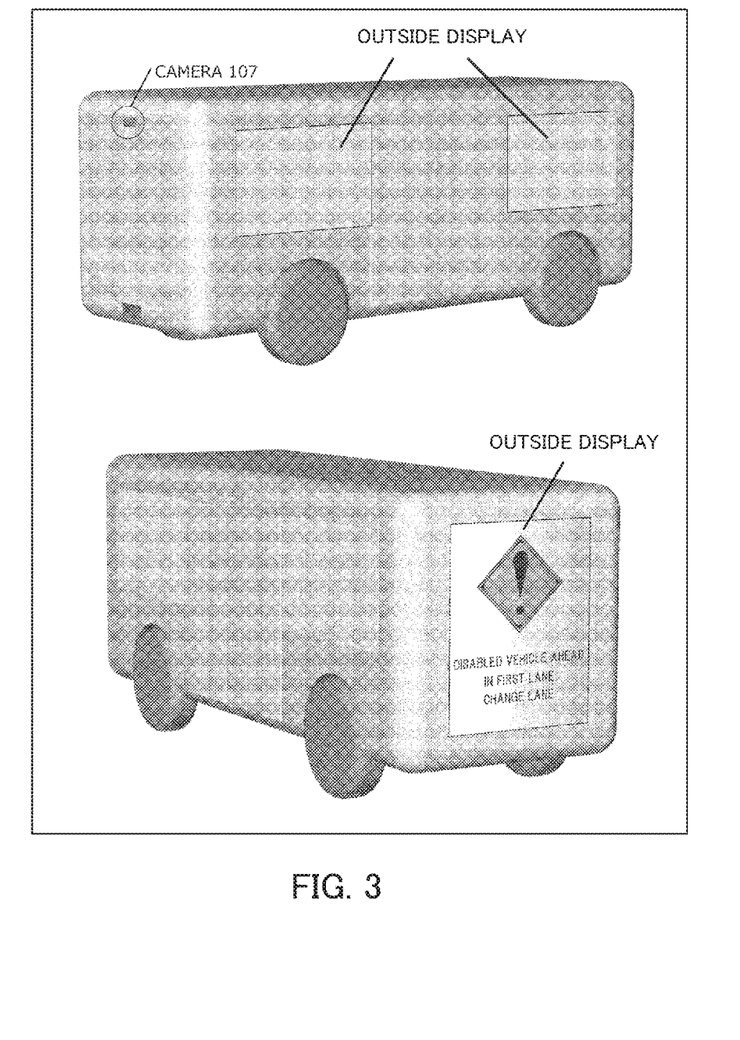
FIG. 3 indicates the outer appearance of an autonomous vehicle 100.

The image output unit 106 is means for outputting an image on the outside display provided on the vehicle body. FIG. 3 indicates an example of the outer appearance of the autonomous vehicle 100. As shown in FIG. 3, the autonomous vehicle 100 has a plurality of displays provided on the outside of the vehicle body, onto which images can be output. The outside displays may be liquid crystal displays or displays composed of LED matrices. The image output unit 106 can create or obtain an image on the basis of data included in the operation plan and output it onto the outside display.

The autonomous vehicle 100 has a camera 107 provided on its body. The camera 107 is an imaging device using an image sensor such as a charge-coupled device (CCD), metal oxide semiconductor (MOS), or complementary metal oxide semiconductor (CMOS) sensor.

As shown in FIG. 3, the autonomous vehicle 100 according to this embodiment has the on-vehicle camera 107, which can capture images (still images or moving images). The autonomous vehicle 100 has a plurality of such cameras 107, which are provided on different portions (e.g. the front, rear, and right and left sides) of the vehicle body.

Now, the server apparatus 200 will be described.

The server apparatus 200 is configured to manage the position of the running autonomous vehicles 100 and send operation commands. For example, in the case where the server apparatus 200 receives from a user a request for dispatch of a taxi, the server apparatus 200 obtains the location of departure and the destination and sends an operation command to an autonomous vehicle 100 that is running in the neighborhood of the place of departure and capable of serving as a taxi.

The server apparatus 200 has a communication unit 201, a control unit 202, and a storage unit 203.

The communication unit 201 is, as with the above-described communication unit 105, a communication interface for communication with autonomous vehicles 100 via a network.

The control unit 202 is means for performing overall control of the server apparatus 200. The control unit 202 is constituted by, for example, a CPU.

The control unit 202 includes as functional modules a vehicle information management part 2021, an operation command creation part 2022, and an external service providing part 2023. These functional modules may be implemented by executing programs stored in storage means, such as a read only memory (ROM), by the CPU.

The vehicle information management part 2021 manages a plurality of autonomous vehicles 100 that are under its management. Specifically, the vehicle information management part 2021 receives positional information from the plurality of autonomous vehicles 100 at predetermined intervals and stores the information in association with the date and time in the storage unit 203, which will be described later. Moreover, the vehicle information management part 2021 holds and updates data about characteristics of the autonomous vehicles 100, if necessary. This data will be hereinafter referred to as "vehicle information". Examples of the vehicle information include, but are not limited to, the identification of each autonomous vehicle 100, the service type, information about the location at which each vehicle is on standby (e.g. car shed or service office), the door type, the vehicle body size, the carrying capacity, the maximum number of passengers, the full charge driving range, the present (or remaining) driving range, and the present status (such as empty, occupied, running, or under operation etc.).

When a request for dispatch of an autonomous vehicle 100 is received from outside, the operation command creation part 2022 determines the autonomous vehicle 100 to be dispatched and creates an operation command according to the vehicle dispatch request. Examples of the vehicle dispatch request are, but not limited to, as follows.

(1) Request for Transportation of Passengers or Goods

This is a request for transportation of a passenger(s) or goods with designation of a place of departure and a destination or a route to be followed.

(2) Request for Dispatch of an Autonomous Vehicle Having a Specific Function

This is a request for dispatch of an autonomous vehicle 100 that has a specific function, such as the function as a shop (e.g. eating house, sales booth, or showcase), an office of a business entity (e.g. private office or service office), or a public facility (e.g. branch of a city office, library, or clinic). The place to which an autonomous vehicle is to be dispatched may be either a single place or multiple places. In the case of multiple places, service may be provided at each of the places.

(3) Request for Patrol on the Road

This is a request for patrol on the road for the purpose of monitoring facilities and/or infrastructures or preventing crimes.

Vehicle dispatch requests are received from users via, for example, a network. The sender of a vehicle dispatch request is not necessarily an ordinary user. For example, the organization that provides the service with the autonomous vehicles 100 may send a vehicle dispatch request.

The autonomous vehicle 100 to which an operation command is to be sent is determined taking account of the positional information of the vehicles and the vehicle information (indicating what function each vehicle has) that the vehicle information management part 2021 has received.

The external service providing part 2023 sends to an autonomous vehicle 100 that is under operation according to an operation command it has received a further operation command based on a crackdown request.

Specifically, in response to a crackdown request sent from the police, the external service providing part 2023 causes the autonomous vehicle 100 to travel along a certain route to collect violation information about nearby vehicles. Such an operation of the autonomous vehicle 100 will be hereinafter referred to as "violation crackdown operation". Details of the violation crackdown operation will be described later.

The storage unit 203 is means for storing information, which is constituted by a storage medium such as a RAM, a magnetic disc, or a flash memory.

<Operations Under Normal Circumstances>

Figure 4:
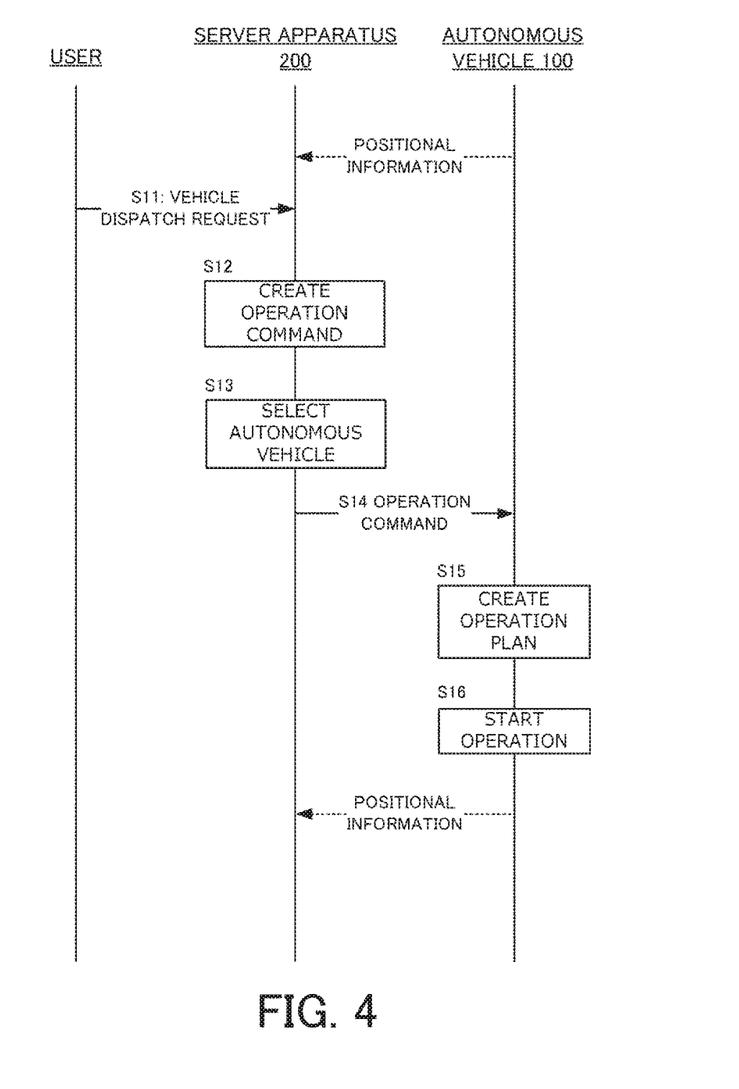
FIG. 4 is a diagram indicating dataflow between elements of the system.

Processing that is performed by each of the above-described components will now be described. FIG. 4 is a diagram illustrating dataflow during the process in which the server apparatus 200 creates an operation command based on a request by a user and an autonomous vehicle 100 starts to operate. Here, a case in which the autonomous vehicle 100 runs in a road network shown in FIG. 5 will be described by way of example.

The autonomous vehicle 100 periodically sends positional information to the server apparatus 200. For example, in the case shown in FIG. 5, the autonomous vehicle 100 informs the server apparatus 200 of its location at node A, and the vehicle information management part 2021 stores the association of the autonomous vehicle 100 with node A as data in the storage unit 203. The positional information is not necessarily positional information of a node itself. For example, the positional information may be information that specifies a node or link. A link may be divided into a plurality of sections. The road network is not necessarily a network represented by nodes and links. The positional information is updated every time the autonomous vehicle 100 moves.

If a user sends a vehicle dispatch request to the server apparatus 200 by communication means (step S11), the server apparatus 200 (specifically, the operation command creation part 2022) creates an operation command according to the vehicle dispatch request (step S12). The operation command may designate a place of departure and a destination or only a destination. Alternatively, the operation command may designate a travel route. The operation command may include information about a task to be done or a service to be provided on the route. Here, a case in which a request for transportation of a person from node B to node C is made will be described.

Figure 5:
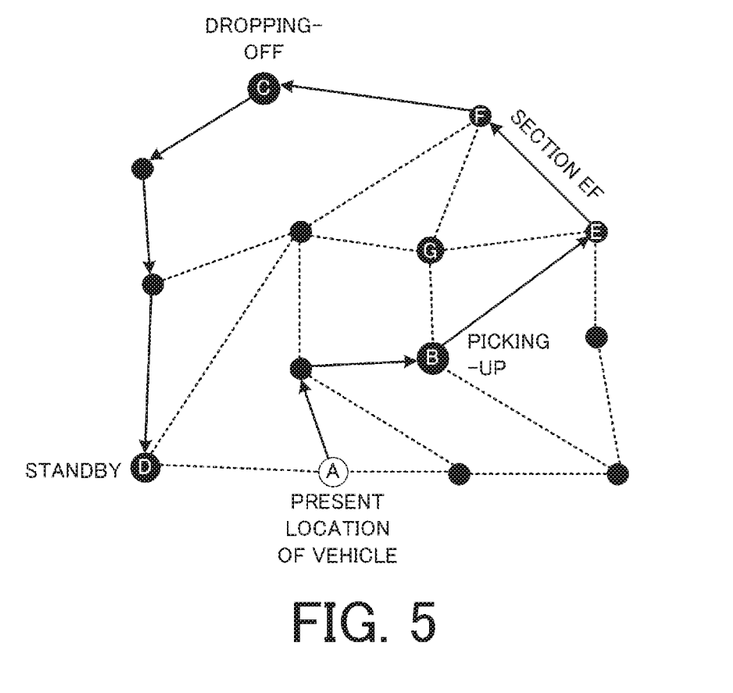
FIG. 5 is a diagram indicating an exemplary road network.

In step S13, the operation command creation part 2022 selects an autonomous vehicle 100 that is to provide the service. For example, the operation command creation part 2022 determines an autonomous vehicle 100 that can provide the requested service and can be delivered to the user within a predetermined time, with reference to the stored positional information and vehicle information of the autonomous vehicles 100. Here, let us assume that the vehicle located at node A in FIG. 5 is selected. Consequently, the server apparatus 200 sends an operation command to the selected autonomous vehicle 100 (step S14).

In step S15, the autonomous vehicle 100 (specifically, the operation plan creation part 1031) creates an operation plan on the basis of the operation command it has received. In the case described here, for example, the autonomous vehicle 100 creates an operation plan to the effect that the autonomous vehicle 100 is to travel along the route indicated by the solid arrows in FIG. 5, pick up and drop off a person at node B and node C respectively, and return to node D. The operation plan thus created is sent to the travel control part 1033, and then the operation is started (step S16). Positional information is sent to the server apparatus 200 periodically during the operation also.

While in the above-described case the operation command is created on the basis of a vehicle dispatch request sent from an external source (i.e. a user), the operation command does not necessarily have to be created on the basis of a vehicle dispatch request sent from an external source. For example, the server apparatus 200 may create an operation command autonomously. Moreover, the creation of an operation plan does not necessarily have to be based on an operation command. For example, in cases where an autonomous vehicle 100 performs patrol for the purpose of surveying streets, the autonomous vehicle 100 may create an operation plan without receiving external instructions. Alternatively, an operation plan may be created by the server apparatus 200.

<Operations During Violation Crackdown>

Next, the operation of the system in cases where a crackdown request is made to the server apparatus 200 by the police will be described.

Firstly, the police sends to the server apparatus 200 a crackdown request, namely a request for collection of violation information, instead of the vehicle dispatch request in step S11 of the above described process. The request for collection of information includes information about a section of a road in which violation information is to be collected. This section will be hereinafter referred to as the "collection section".

After receiving the request for collection of violation information, the server apparatus 200 (specifically, the external service providing part 2023) creates an operation command to the effect that an autonomous vehicle 100 is to collect violation information in the collection section and determines the autonomous vehicle 100 that is to perform the violation crackdown operation by a process similar to that described above as steps S12 and S13.

In the case described here, let us assume that the collection section is the section EF from node E to node F. Furthermore, let us assume that an autonomous vehicle 100 that is presently located at node B and planned to drop off a person(s) at node C is selected as the autonomous vehicle 100 to perform violation crackdown operation.

Figure 6:
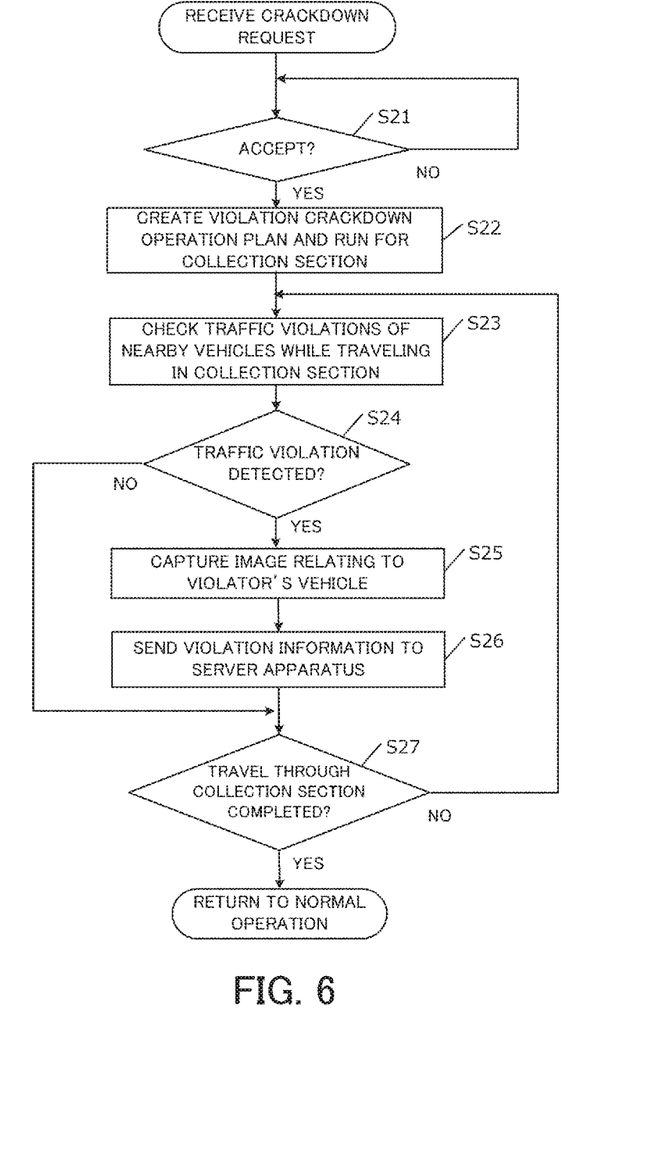
FIG. 6 is a flow chart of a process executed by the autonomous vehicle 100 when performing a violation crackdown operation according to the first embodiment.

FIG. 6 is a flow chart of a process performed by an autonomous vehicle 100 that has received a crackdown request.

Firstly in step S21, it is determined whether or not to accept the crackdown request. There may be situations in which the autonomous vehicle 100 had better not accept the crackdown request because of its own emergency. An example of such situations is that the autonomous vehicle 100 is employed by a medical institution and presently transporting a patient. In such cases, the autonomous vehicle 100 may determine not to accept the crackdown request. The autonomous vehicle 100 may consult the user on board and accept the crackdown request only when user's consent is obtained.

In step S22, the autonomous vehicle 100 creates a violation crackdown operation plan, namely creates a travel route based on the crackdown request, and runs for the collection section along that travel route. In the case described here, a travel route including the collection section EF is created, and the autonomous vehicle 100 runs for the section EF. Specifically, as shown by the solid arrows in FIG. 5, a route from node B to node E, through section EF, and then from node F to node C is created. This travel route may be identical to the travel route of the autonomous vehicle 100 that was planned on the basis of a request for transportation of a person(s) before the reception of the crackdown request in some cases. If, for example, the travel route planed on the basis of a request for transportation of a person(s) is a route from node B to node C through nodes G and F, the travel route is changed in the processing of step s22 to a route from node B to node E, through section EF, and then from node F to node C.

While travelling in section EF, the autonomous vehicle 100 acquires driving information of nearby vehicles to check traffic violations by the nearby vehicles (step S23). In the case described here, the autonomous vehicle 100 measures the speed of the nearby vehicles as the driving information and detects speeding of the nearby vehicles in excess of the legal speed limit as a traffic violation.

The autonomous vehicle 100 can measure the speed of the vehicles running ahead and behind of it using radars included in the sensors 101 arranged on the front and rear of the vehicle body. For example, the autonomous vehicle 100 emits radio waves to a vehicle running ahead of it and determines the speed of the vehicle running ahead of it from the frequency of radio waves reflected from that vehicle.

Alternatively, the autonomous vehicle 100 can measure the speed of nearby vehicles by tracking them using stereo cameras included in the sensors 101 provided on the front, rear, and both sides of the vehicle body.

This embodiment is not intended to limit the method of measuring the speed of nearby vehicles only to those described above. The autonomous vehicle 100 may measure the speed of nearby vehicles using any known methods.

In cases where the crackdown request sent from the server apparatus 200 to the autonomous vehicle 100 is a request for crackdown on speeding in excess of the speed limit, information about the legal speed limit in the section EF is included in the crackdown request. However, information about the legal speed limit is not necessarily included in the crackdown request. In the case where information about the legal speed limit is not included in the crackdown request, the autonomous vehicle 100 may obtain the legal speed limit by perceiving a traffic sign or the like by the environment perceiving part 1032.

The autonomous vehicle 100 detects traffic violations by nearby vehicles on the basis of the speed of the nearby vehicles measured by the sensors 101 and the legal speed limit in the section EF. This detection of traffic violations is performed by the environment perceiving part 1032.

In order to actually crack down on a traffic violation by a vehicle on the basis of the detected traffic violation, it is necessary to identify that vehicle.

For this purpose, when a traffic violation by a nearby vehicle is detected in step S24, the autonomous vehicle 100 captures an image(s) relating to that violator's vehicle using the camera 107 (step S25). This image is used to identify the violator's vehicle and includes an image of a license plate of the violator's vehicle. Moreover, the image may include an image of the driver of that vehicle. Moreover, the captured image may include an image of the outer appearance of the violator's vehicle or an image of the environment of the violator's vehicle.

In step S26, the autonomous vehicle 100 sends violation information about the violator's vehicle to the server apparatus 200. The violation information includes information about the speed of the violator's vehicle and an image(s) relating to the violator's vehicle. Thus, the server apparatus 200 obtains details of the detected traffic violation and can identify the violator's vehicle.

The violation information is sent from the server apparatus 200 to the police. After receiving the violation information, the police may notify the violator of the details of the traffic violation later. In the case of the sort of traffic violation that is considered to require a quick crackdown, a policeman may be dispatched immediately to the violator's vehicle. In that case, the server apparatus 200 may send the violation information with additional information indicating that an immediate crackdown on a malicious traffic violation is required.

After traveling through the collection section EF in step S27, the autonomous vehicle 100 returns to its normal operation.

As above, according to the first embodiment, a crackdown request is sent to an autonomous vehicle 100 under operation to cause it to function as a mobile object that checks traffic violations by vehicles present in the vicinity of that autonomous vehicle 100. A traffic violation crackdown network constructed using a plurality of such mobile objects enables crackdown on traffic violations by vehicles to be carried out in a preferable manner.

Second Embodiment

In the above-described first embodiment, speeding of a nearby vehicle around the autonomous vehicle 100 in excess of the legal speed limit is detected as a traffic violation. In the second embodiment, failure by a nearby vehicle in maintaining a sufficient inter-vehicle distance is detected as a traffic violation. In other words, violations by nearby vehicles of a traffic rule that requires a sufficient inter-vehicle distance are detected. This will be specifically described in the following.

The autonomous vehicle 100 senses a plurality of vehicles that pass by its side to measure the distance between those vehicles. Thus, the autonomous vehicle 100 detects a vehicle whose distance to the vehicle immediately in front of it is too short, namely a tailgating vehicle.

The autonomous vehicle 100 is configured to be capable of sensing a plurality of vehicles passing by its side using a radar included in each of the sensors 101 provided on the sides thereof. For example, the autonomous vehicle 100 emits radio waves in a lateral direction and determines whether there is a vehicle passing by its side or not on the basis of the time taken until the reception of the reflected radio waves. The autonomous vehicle 100 continues such sensing while running to sense vehicles passing by its side. Then, the autonomous vehicle 100 can determine the distance between the vehicles passing by its side.

Alternatively, the autonomous vehicle 100 may determine the distance between a plurality of vehicles passing by its side by tracking nearby vehicles using stereo cameras included in the sensors 101 provided on the front, rear, and both sides of the autonomous vehicle 100.

This embodiment is not intended to limit the method of determining the inter-vehicle distance only to those described above. The autonomous vehicle 100 may determine the inter-vehicle distance using any known methods.

The autonomous vehicle 100 can carry out a violation crackdown operation by performing the process shown in FIG. 6 described in the first embodiment. This enables crackdown on traffic violations by vehicles to be carried out in a preferable manner.

Third Embodiment

As shown in FIG. 3, the autonomous vehicle 100 has outside displays, onto which images can be output by the image output unit 106.

In the system according to the third embodiment, the operation command creation part 2022 of the server apparatus 200 creates or obtains data of an image(s) to be displayed on the outside displays and creates an operation command including the image data. Thus, the autonomous vehicle 100 can provide a notice that calls attention to a certain traffic issue using the image output unit 106 while traveling.

Figure 7A:
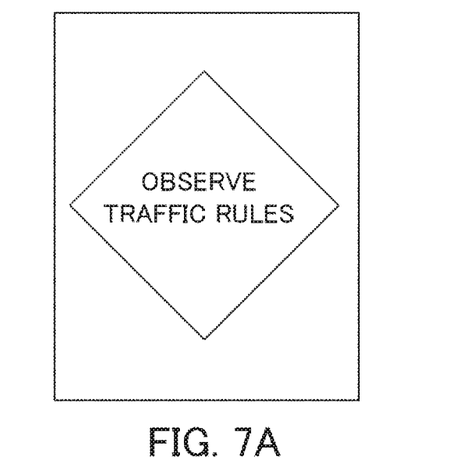
FIG. 7A indicates a first exemplary image output on an outside display according to a third embodiment.
Figure 7B:
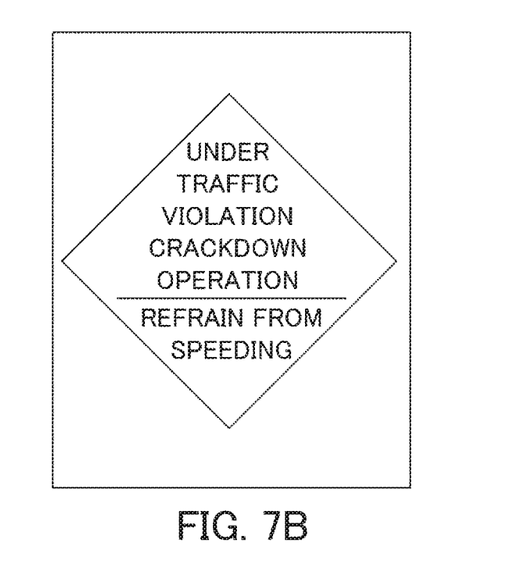
FIG. 7B indicates a second exemplary image output on the outside display according to the third embodiment.

For example, the autonomous vehicle 100 may display a message requesting observance of traffic rules to the drivers of nearby vehicles as shown in FIG. 7A or a message indicating that the autonomous vehicle 100 is performing a violation crackdown operation as shown in FIG. 7B.

While in this embodiment the autonomous vehicle 100 provides a notice by an image, voice may also be employed. For example, in cases where the autonomous vehicle 100 has a speaker provided outside the vehicle, a notice may be provided to people around by voice. The image data and/or voice data may be included in the operation command. Alternatively, image data and/or voice data stored in the autonomous vehicle 100 may be used.

Providing a notice in the above-described manner can lead to a reduction of traffic violations.

Fourth Embodiment

The system according to the above-described first embodiment is an exemplary information collection system including autonomous vehicles 100 and a server apparatus 200. The system according to the fourth embodiment is an exemplary information collection apparatus including autonomous vehicles 100. This apparatus will be described in the following specifically.

The autonomous vehicle 100 according to the fourth embodiment has a storage unit. Operation commands are stored in the storage unit in advance. The storage unit is means for storing information, which is constituted by a storage medium such as a RAM, a magnetic disc, or a flash memory.

The operation commands are plans of violation crackdown operation that were created in advance by the police. An example of the operation plan is "acquiring violation information in a collection section at a designated date and time".

Figure 8:
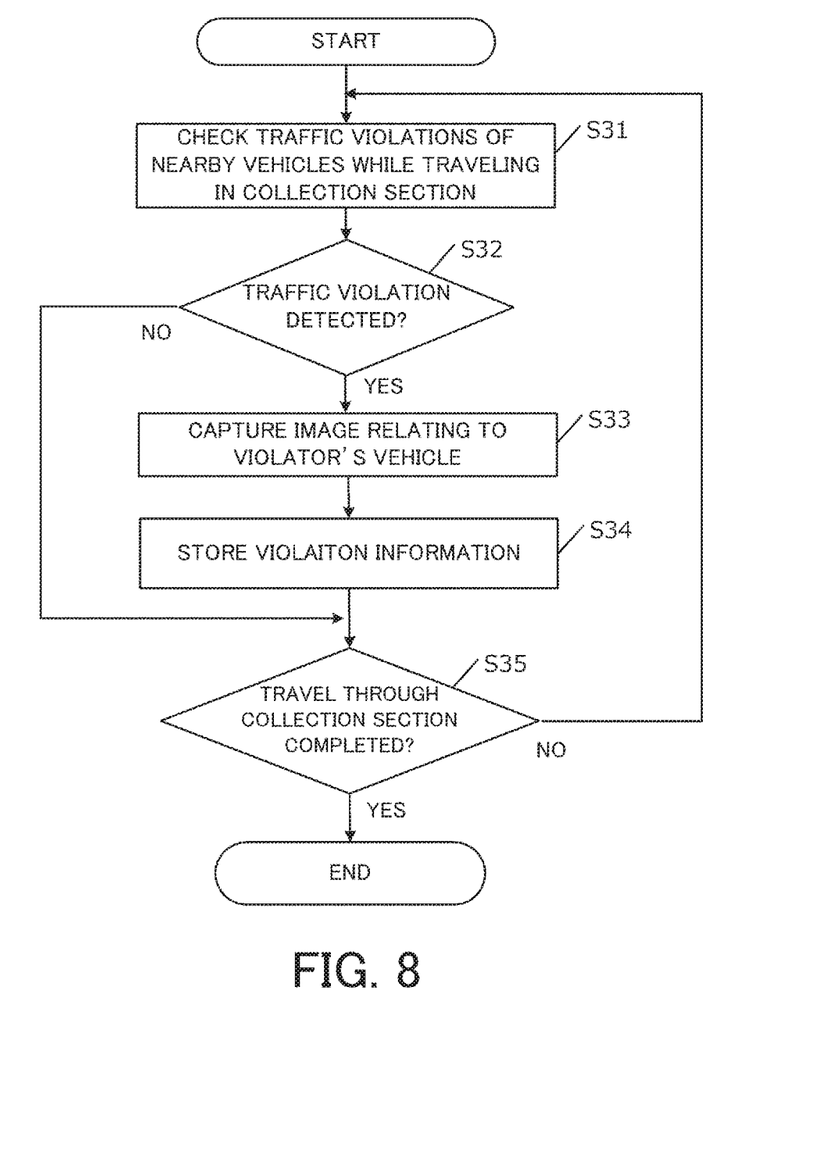
FIG. 8 is a flow chart of a process executed by the autonomous vehicle 100 when performing a violation crackdown operation according to a fourth embodiment.

FIG. 8 is a flow chart of a process performed by the autonomous vehicle 100 according to this embodiment.

The autonomous vehicle 100 that is traveling in the collection section at the designated date and time acquires driving information about nearby vehicles while traveling in the collection section to check traffic violations by the nearby vehicles (step S31). This processing is the same as that of step S23 in the process described in the description of the first embodiment.

When the autonomous vehicle 100 detects a traffic violation by a nearby vehicle in step S32, it captures an image relating to that violator's vehicle using the camera 107 (step S33). This processing is the same as that of step S25 in the process described in the description of the first embodiment.

Then, in step S34, the autonomous vehicle 100 stores violation information about the violator's vehicle in the storage unit. The violation information includes the driving information of the violator's vehicle and the image relating to the violator's vehicle.

The autonomous vehicle 100 continues the violation crackdown operation till the end of its travel through the collection section in step S35.

The police can crack down traffic violations by accessing the storage unit of the autonomous vehicle 100 to retrieve the violation information stored in the storage unit.

(Modification)

The above embodiments have been described merely as illustrative examples, to which various modifications can be made without departing from the essence of the present disclosure.

For example, in the above description of the embodiment, we described that when detecting a traffic violation by a nearby vehicle, the autonomous vehicle 100 captures an image of the license plate of that violator's vehicle (and an image of the driver of that vehicle). However, there may be cases where it is difficult to capture such an image. In that case, the autonomous vehicle 100 may capture images of the outer appearance of the violator's vehicle and the environment of the violator's vehicle and send them to the server apparatus 200.

Then, the server apparatus 200 judges whether or not it is possible to identify the violator's vehicle by the image sent from the autonomous vehicle 100. Even in the case where the server apparatus 200 judges that it is not possible to identify the violator's vehicle, the police can identify the violator's vehicle using the image provided by the server apparatus 200, the positional information of the location at which the image is captured, and, for example, information acquired by an automatic vehicle number reading device provided on the road.

In cases where it is not possible to identify the violator's vehicle only by an image captured by only one autonomous vehicle 100, the server apparatus 200 may cause a plurality of autonomous vehicles 100 to capture images relating to the violator's vehicle to enable identification of the violator's vehicle. In that case, the server apparatus 200 may select other autonomous vehicles 100 that are to crack down the violator's vehicle on the basis of the positional information sent from the autonomous vehicle 100 that has captured the image of the violator's vehicle and send the selected autonomous vehicles 100 to the violator's vehicle.

While in the above-described embodiments, images are captured by the camera with which the autonomous vehicle 100 is equipped, the camera used to capture images is not necessarily one fixed on the vehicle. For example, an unmanned aircraft such as a drone may be used to capture images. The autonomous vehicle 100 may be provided with a base for landing and takeoff of such an unmanned aircraft.

What is claimed is:

1. An information collection system comprising an autonomous mobile object and a server apparatus,
    the autonomous mobile object comprising:
        a driving information acquirer configured to acquire driving information relating to a state of driving of a nearby vehicle, which is defined as a vehicle present in the vicinity of the autonomous mobile object;
        an image acquirer configured to capture an image of an environment of the autonomous mobile object; and
        a controller configured to:
            create a travel route including a collection section of a road network in which violation information is to be collected included in an operation command in response to receiving the operation command from the server apparatus;
            control a traveling of the autonomous mobile object based on the travel route;
            detect a traffic violation by the nearby vehicle while the autonomous mobile object travels along the travel route on the basis of the driving information acquired by the driving information acquirer; and
            send violation information relating to the traffic violation to the server apparatus, and
    the server apparatus comprising:
        a control unit configured to:
            create the operation command in response to a request for collection of violation information; and
            send the operation command to the autonomous mobile object; and
        a first storage unit configured to receive the violation information from the autonomous mobile object and store it,
    wherein when the traffic violation is detected by the controller, the controller sends a captured image relating to a violator's vehicle acquired by the image acquirer and the driving information about the violator's vehicle acquired by the driving information acquirer to the server apparatus as the violation information.

2. The information collection system according to claim 1, wherein the driving information acquirer acquires a speed of the nearby vehicle as the driving information, and the controller detects speeding of the nearby vehicle in excess of a legal speed limit as the traffic violation.

3. The information collection system according to claim 1, wherein the driving information acquirer senses another vehicle to thereby acquire an inter-vehicle distance between the nearby vehicle and the another vehicle as the driving information, and the controller detects failure by the nearby vehicle in maintaining a sufficient inter-vehicle distance between the nearby vehicle and the another vehicle as the traffic violation.

4. The information collection system according to claim 1, wherein the captured image relating to the violator's vehicle acquired by the image acquirer comprises an image of a license plate of that vehicle.

5. The information collection system according to claim 1, wherein the captured image relating to the violator's vehicle acquired by the image acquirer comprises an image of a driver of that vehicle.

6. The information collection system according to claim 1, wherein the autonomous mobile object further comprises a notifier configured to provide a notice about a traffic violation.

7. The information collection system according to claim 1, wherein the request for collection of violation information includes information about a section of road.

8. An information collection apparatus comprising:
    an autonomous mobile object that moves autonomously;
    a driving information acquirer provided in the autonomous mobile object configured to acquire driving information relating to a state of driving of a nearby vehicle, which is defined as a vehicle present in the vicinity of the autonomous mobile object;
    an image acquirer provided in the autonomous mobile object configured to capture an image of an environment of the autonomous mobile object;
    a controller configured to:
        create a travel route including a collection section of a road network in which violation information is to be collected included in an operation command in response to receiving the operation command from a server apparatus;
        control a traveling of the autonomous mobile object based on the travel route;
        detect a traffic violation by the nearby vehicle while the autonomous mobile object travels along the travel route on the basis of the driving information acquired by the driving information acquirer;
    a storage unit provided in the autonomous mobile object configured to store violation information relating to the traffic violation detected by the controller,
    wherein when the traffic violation is detected by the controller, the controller stores a captured image relating to a violator's vehicle acquired by the image acquirer and the driving information about the violator's vehicle acquired by the driving information acquirer in the storage unit as the violation information.

* * * * *